(12) United States Patent
Peuziat

(10) Patent No.: US 12,445,354 B2
(45) Date of Patent: Oct. 14, 2025

(54) DEPLOYING NETWORK FUNCTIONS OF A NETWORK SLICE

(71) Applicant: HEWLETT PACKARD ENTERPRISE DEVELOPMENT LP, Spring, TX (US)

(72) Inventor: Xavier Peuziat, Grenoble (FR)

(73) Assignee: Hewlett Packard Enterprise Development LP, Spring, TX (US)

( * ) Notice: Subject to any disclaimer, the term of this patent is extended or adjusted under 35 U.S.C. 154(b) by 337 days.

(21) Appl. No.: 17/993,148

(22) Filed: Nov. 23, 2022

(65) Prior Publication Data

US 2024/0073092 A1 Feb. 29, 2024

(30) Foreign Application Priority Data

Aug. 25, 2022 (EP) .................................. 223062647

(51) Int. Cl.
| | |
|---|---|
| *H04W 8/08* | (2009.01) |
| *H04L 41/0893* | (2022.01) |
| *H04L 41/122* | (2022.01) |
| *H04L 41/5051* | (2022.01) |
| *H04W 60/00* | (2009.01) |

(52) U.S. Cl.
CPC ........ *H04L 41/0893* (2013.01); *H04L 41/122* (2022.05); *H04L 41/5051* (2013.01); *H04W 60/00* (2013.01)

(58) Field of Classification Search
CPC ..... H04W 48/18; H04W 60/04; H04W 12/06; H04W 52/243; H04W 24/02; H04W 52/16; G06N 3/04; G06N 3/08; H04B 7/024; F21S 8/086; H01Q 3/46; H01Q 21/28

See application file for complete search history.

(56) References Cited

U.S. PATENT DOCUMENTS

| | | | |
|---|---|---|---|
| 11,038,776 B2 | 6/2021 | Lee et al. | |
| 11,140,231 B2 * | 10/2021 | Cakulev | H04L 67/51 |
| 2021/0152554 A1 * | 5/2021 | Taft | H04L 41/0895 |

FOREIGN PATENT DOCUMENTS

| | | |
|---|---|---|
| WO | 2021/140272 A1 | 7/2021 |
| WO | 2021/165194 A1 | 8/2021 |

(Continued)

*Primary Examiner* — Phuoc H Doan
(74) *Attorney, Agent, or Firm* — Hewlett Packard Enterprise Patent Department

(57) ABSTRACT

Examples described herein relate to techniques for concurrent deployment of a set of network function (NF) instances of a network slice. In some examples, each NF instance may be registered at the NRF with its status indicator set to DEPLOYING. Further, a determination may be performed if a first NF instance is waiting to be deployed and deployment of the first NF instance is dependent on a second NF instance that is pending deployment. Responsive to the determination, a status indicator of the first NF instance may be updated from DEPLOYING to WAIT_REGISTERING. Further, the first NF instance may subscribe to be notified at the NRF of a change in the status indicator of the second NF instance. Responsive to being notified, the first NF instance may update its status indicator to REGISTERED, such that the first NF instance is discoverable by other NF instances of the set of NF instances.

20 Claims, 8 Drawing Sheets

(56) References Cited

FOREIGN PATENT DOCUMENTS

| WO | 2021/198207 A1 | 10/2021 |
| WO | 2021/224544 A1 | 11/2021 |
| WO | 2021/224545 A1 | 11/2021 |
| WO | 2021/240055 A1 | 12/2021 |
| WO | 2021/251948 A1 | 12/2021 |

\* cited by examiner

DEPLOYING NETWORK FUNCTIONS OF A NETWORK SLICE

BACKGROUND

Network slicing is a feature enabled by modern communication systems, such as 5th Generation (5G) mobile network. Network slicing may enable multiple logical networks (or slices) to be deployed on same physical infrastructure resources. Various resources such as computing, storage, access, transport, Virtual Network Functions (VNFs), and so on can be dedicated to a single slice or shared among multiple slices. Network slicing may include instantiation, configuration, and/or activation of target network slices. A set of Network Functions (NFs)/NF instances may be selected for a given network slice. Those NF instances are instantiated, configured, and/or activated. Various resources may be allocated for the selected NF instances to support a network slice. The NF instances may be registered at a Network Function (NF) Repository Function (NRF) such that they may be discovered by other NF instances. Based on the availability of a network slice, one or more user device(s) can use customized services offered by that particular network slice.

BRIEF DESCRIPTION OF THE DRAWINGS

The present disclosure, in accordance with one or more various examples, is described in detail with reference to the following figures. The figures are provided for purposes of illustration only and merely depict examples, wherein.

Figure 1:
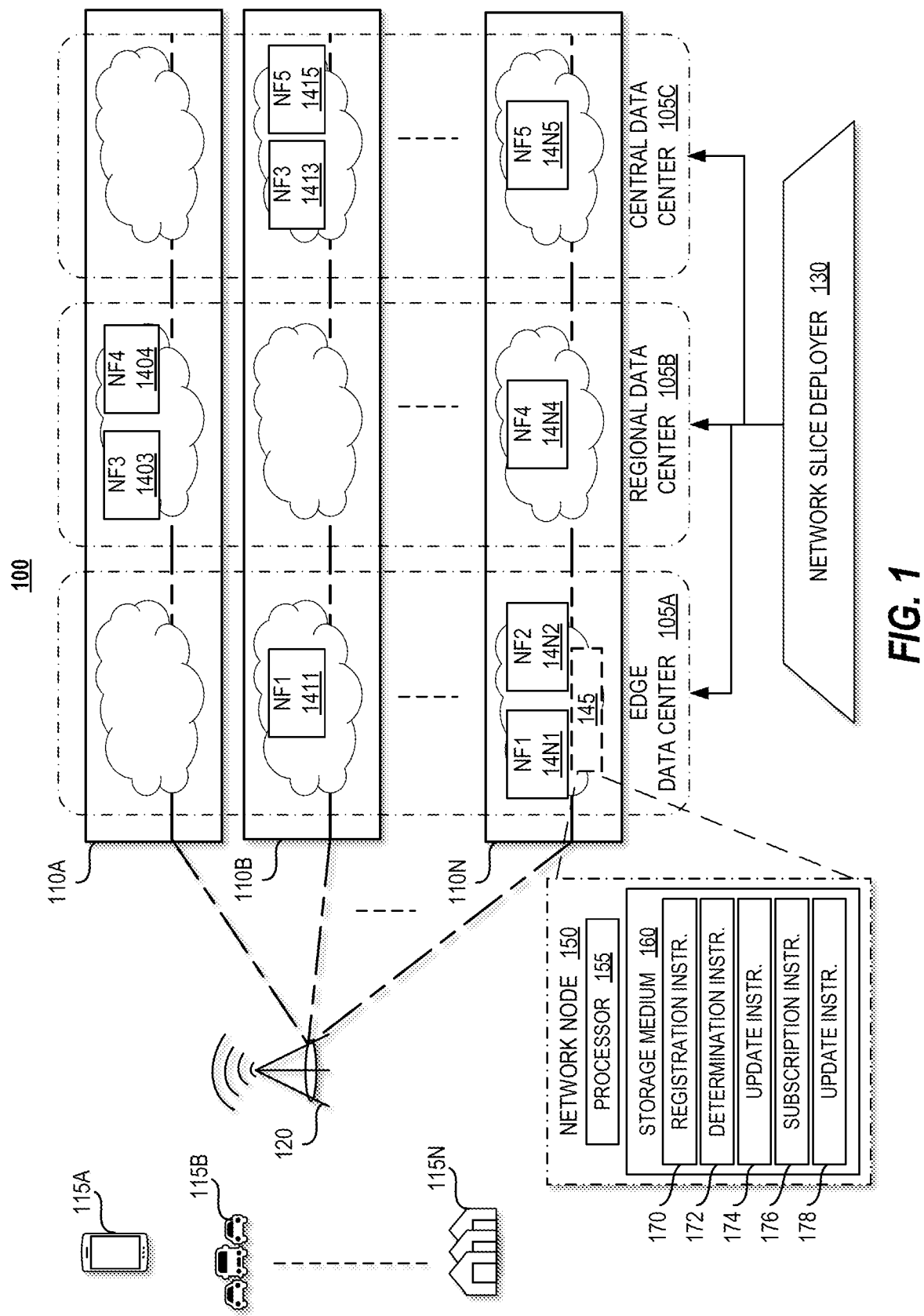
FIG. 1 illustrates a schematic view of a network architecture in which various examples of the present disclosure may be implemented.

The figures are not exhaustive and do not limit the present disclosure to the precise form disclosed.

DETAILED DESCRIPTION

Evolving communication systems, such as 5G mobile networks, are expected to deliver improved transmission capacity with reduced packet transmission delays. With network slicing, Cellular Services Providers (CSPs) can create and launch custom services with varying network requirements for a wide variety of applications and services, such as the Internet of Things (IoT), Augmented Reality (AR), autonomous vehicle technologies, etc. CSPs may rely on virtualization technologies, such as Network Function Virtualization (NFV) for network slicing. As used herein, NFV is a feature to virtualize network services, such as routing, security, load balancing, and so forth that have traditionally been run on dedicated hardware. NFV may be implemented by separating NF instances of a network slice from the physical resources that it is deployed on, allowing CSPs to manage and expand their network capabilities on demand. Further, such implementation may be optimized for deployment on distributed resources, such as cloud infrastructure. Cloud infrastructure resources can be dynamically provisioned for optimal resource utilization, energy consumption, etc. Thus, 5G services, which are cloud-native, can support a range of applications with continually updated capabilities. Further, CSPs may use automation-driven services, such as Continuous Integration (CI) and/or Continuous Deployment (CD) for continuous updates.

In some instances, a network slice deployer, such as a DevOps model, which is based on CD capability, may be used for automated deployment of a 5G network slice. For instance, a network slice deployer may deploy various components of a 5G network slice on a container orchestration platform. In some examples, a network slice deployer may use parallel instantiation of the NF instances composing a network slice, in the interest of speeding up deployment. However, such a deployment process may impact reliability as the startup of certain NF instances may fail due to their dependency on other NF instances pending deployment. Consequentially, a large amount of error information, such as logs, traces, and/or alerts may be created, which can be irrelevant information from the perspective of monitoring/troubleshooting—considering that there may not be an actual fault or failure in the system.

Further, such information may cause congestion creating an overhead on observability application(s). Generally, an observability application may be used to monitor and/or troubleshoot a status and/or behavior of an NF instance. Due to concurrent instantiation, multiple NF instances may cumulatively create a large volume of irrelevant information; thereby, causing additional resources to be allocated to observability applications. Moreover, some of the critical error information may get lost in such large volumes of irrelevant information making segregation and prioritization of errors a challenge. In some other known processes, a network slice deployer with a CD pipeline may process concurrent instantiation of certain NF instances, which may not have dependency over other NF instances. Whereas, NF instances with dependencies may be processed in sequence such that certain NF instances may wait for the deployment of their NF dependencies first, and thus their registration at the NRF. Even though such a process may reduce irrelevant information, it impacts the speed of deployment.

The present disclosure provides techniques for parallel instantiation of NF instances of a network slice with reliability and speed. According to example techniques of the present disclosure, a method may include deploying an NRF first based on a determination that the NRF is part of a network slice being deployed and the NRF is pending to be deployed. In one example, a set of NF instances of a network slice are registered at the NRF. A status indicator of each NF instance of the set of NF instances is set to 'DEPLOYING.' Status indicators of NF instances that are deployed and started may be set to 'REGISTERED.' As used herein, an NF instance is considered to be started when processes that compose NF instance-related applications have started and the NF instance is capable of handling network traffic. The starting of processes may refer to a software package running on a platform. In some examples, the platform can be a container orchestration platform and the software package may include components such as a code and associated runtime, system libraries, and/or any default values for settings. In one example, the software package can be a container or a container image. Further, the status indicator of NF instances that are waiting to be deployed and have dependencies on one or more NF instances that are pending deployment is set to 'WAIT_REGISTERING.' Thus, an NF instance may be considered to be deployed by other NF instances when its status indicator is updated to 'REGISTERED.' The deployed NF instance can be an NF service producer that can provide services based on a service request from an NF service consumer. In some examples, a network slice deployer may perform one or more steps of the techniques discussed herein. In some other examples, a network management system, which is capable of managing one or more components of a network architecture may perform at least certain steps of techniques discussed herein. In some further examples, techniques discussed herein may be performed on a container orchestration platform, a network node of network architecture, or a computing device with a processor executing instructions stored on a storage medium.

In some existing communication system standards, such as 5G, NF instances may have three statuses, namely 'REGISTERED,' 'SUSPENDED,' and 'DISCOVERABLE.' 'REGISTERED' may indicate that an NF instance is registered at the NRF and discoverable by other NF instances. 'SUSPENDED' may indicate that an NF instance is registered at the NRF and is not operative but discoverable by other NF instances. 'DISCOVERABLE' may indicate that an NF instance is registered at the NRF and is operative but not discoverable by other NF instances.

As described above, the present disclosure provides techniques for the reliable deployment of a network slice with improved speed. To aid in reliable and improved deployment of NF instances, three statuses and corresponding status indicators, namely 'DEPLOYING,' 'WAIT_REGISTERING,' and 'UNDEPLOYING,' are introduced. These status indicators can be recognized by the NRF and NF instances.

'DEPLOYING' may be interpreted by the NRF as an NF instance that is registered at the NRF, and is not operative but can be discovered by other NF instances. Other NF instances may interpret this status indicator as suggesting that the NF having the 'DEPLOYING' indicator is waiting to be deployed or a deployment process is in progress. Further, the status indicator of the given NF instance may subsequently change to 'REGISTERED' on deployment. For example, NF instances can discover other NF instances that are registered at the NRF with a status 'DEPLOYING,' and subscribe to be notified of a change in the status indicator to 'REGISTERED.'

'WAIT_REGISTERING' may be interpreted by the NRF as an NF instance that is registered at the NRF is not operative but can be discovered by other NF instances. This status indicator may indicate to other NF instances that an NF instance is ready to be registered but waiting for other NF instances that it depends on to finish deploying before it finishes its deployment. Thus, other NF instances can discover an NF instance that is registered at the NRF with the status set to 'WAIT_REGISTERING.' Specifically, these other NF instances can subscribe to be notified of a status change when the status indicator changes to 'REGISTERED.'

According to techniques of the present disclosure, an NF instance waiting for another NF instance, which is pending deployment, can subscribe at the NRF to be notified of a status change of the NF instance pending deployment. Thus, instead of repeatedly pinging the NRF to check for a status change, the NF instance may wait to be notified by the NRF about a status change. Thus, NF instances may not create irrelevant information, which may be caused due to frequent pining, as the creation of unnecessary error logs is limited or eliminated. An NF instance that is waiting for deployment due to its dependency on another NF instance may update its status to 'REGISTERED' based on discovery or on being notified of a status change of the given NF instance. Thus, techniques disclosed herein enable NF instances in a network slice to be efficiently deployed in parallel.

In some examples, an NF instance may wait for other NF instances due to its dependency on other NF instances. A waiting NF instance may be notified by the NRF of a status change, or the waiting NF instance may discover NF instance/s of interest at the NRF when there is a status change of the NF instance/s of interest. Examples provided below may further account for NF instances that are dependent on each other for deployment. Even in conditions where two NF instances have such an interdependency, techniques disclosed herein may enable each of the NF instances to complete registration. In conditions with interdependency, NF instances can discover each other and complete registration. In one example, a first NF instance can be waiting for a second NF instance with the status indicator of the first NF instance set to 'WAIT_REGISTERING.' The first NF instance may subscribe to be notified whenever the status indicator of the second NF instance changes. Similarly, the second NF instance may query at the NRF for the status of the first NF instance. Based on a response received from the NRF that the first NF instance is waiting for the second NF instance with the status indicator of the first NF instance being 'WAIT_REGISTERING,' the second NF instance may declare itself 'REGISTERED.' For the purpose of declaration of the status indicator as 'REGISTERED,' the second NF instance may update its status indicator value at the NRF. Further, the first NF instance can also declare itself 'REGISTERED' at the NRF by updating its status indicator value at the NRF, thereby eliminating a deadlock condition between the first and second NF instances.

Further, techniques may include deregistering one or more NF instances of the set of NF instances based on a determination that the one or more NF instances have failed deployment and are subsequently deregistered. Also, a network slice deployer may enable concurrent undeployment of a set of instances in the same manner as that of concurrent deployment. In some examples, responsive to the initiation of an undeployment process of the network slice, the network slice deployer, on behalf of the NF instance, may update the status indicator of each of the set of instances at the NRF to 'UNDEPLOYING' whereby the NF instances are concurrently undeployed.

FIG. 1 illustrates a schematic view of a network architecture 100 in which various examples of the present disclosure may be implemented. The network architecture 100 illustrates selected, non-limiting components corresponding to a communication system. In one example, the communication system is a 5G communication system. In some other examples, the communication system can be related to a Fourth Generation (4G) or earlier, or a Sixth Generation (6G) or later generation communication system.

In some examples, the network architecture 100 may be scalable with an agile infrastructure, which may be based on various architectural concepts. In one example, the architectural concepts may include one or more of Network Function Virtualization (NFV), container orchestration, Software Defined Networking (SDN), network slicing, etc. In some further examples, the aforementioned agile infrastructure may be distributed with infrastructure resources spread across from the Edge to the cloud. As used herein, the Edge may refer to a location that may be in proximity to a data source. Further, in an example, a communication system may include network functions, applications, and/or services that can be deployed as workloads on distributed infrastructure resources. As used herein, an infrastructure resource may be composed of physical and/or virtual resources that support storage, processing, networking, communication, etc.

As alluded above, in some examples, the network architecture 100 may be distributed with resources, such as servers, spread across a plurality of data centers. Per the illustrative example of FIG. 1, these data centers may include an Edge data center 105A, a regional data center 105B, and a central data center 105C. As used herein, an Edge data center may refer to a data center that is located closer to a data source when compared to a traditional data center. A central data center may be located farther from the data source when compared to an Edge data center. A regional data center may be geographically and/or logically disposed between an Edge data center and a central data center. Although three data centers are illustrated in the network architecture 100 of FIG. 1, the number of data centers is not limited to the illustrated example and may include any number of data centers. Each data center may include physical or virtual resources to instantiate network functions corresponding to various network slices.

Further, a communication system may include multiple network slices that can be supported by the network architecture 100. Multiple network slices may be used to support diverse use cases based on customer demand and/or segmentation. Each network slice may utilize a portion of the infrastructure resources. In the ongoing example, the network architecture 100 includes a plurality of network slices 110A, 110B, . . . , 110N. Each of these network slices 110A-110N may be realized using infrastructure resources deployed at one or more of the data centers 105A-105D.

According to some examples, the network slices 110A-110N may use NFV to instantiate various network functionalities onto virtual resources, as opposed to traditionally used fixed resources. NFV can be used to manage infrastructure resources required during the life cycle of a network slice. Further, SDN may also be used that enables the provisioning of virtual resources located at the Edge, the regional, or the central data centers 105A, 105B, or 105C. In one example, an SDN may include an application layer, a control layer, and an infrastructure layer. The application layer enables network resources to develop applications related to automation, configuration, management, monitoring, troubleshooting, policies, and/or network security. The infrastructure layer may manage basic network services, such as data forwarding and rule processing for the control plane. In further examples, Application Programming Interfaces (APIs) of the control layer may be configured to handle traffic flow. The control plane functionalities may by way of a set of interconnected network functions provide access to each other's services.

The network architecture 100 may facilitate communication for various categories of user equipment (UE) 115A-115N. That is, each network slice may be customized to cater to a specific category of UE. In the illustrative example, a first network slice 110A caters to cellular phones 115A as UEs. Similarly, a second and $N^{th}$ network slice 110B and 110N cater to automotive vehicles 115B and home automation 115N, respectively. As used herein, a UE can be any other communication device, such as a portable computing device, an IoT device, a sensing/metering device, a smart television, a security device (e.g., security camera), a vehicle control system, a network device, a remotely piloted aerial vehicle (e.g., drone), or any other device with communication capability.

The network architecture 100 may include a network slice deployer 130 that may be used for dynamic deployment of the network slice/s. The network slice deployer 130 may include a deployment pipeline with at least one of Continuous Integration (CI) and Continuous Deployment (CD) capabilities used for onboarding a network slice corresponding to a network service. In one example, the network service may be offered completely on cloud-native network resources. In another example, a combination of the Edge resources, data center/s, and cloud-native resources may be used.

Further, the network architecture 100 may include a Radio Access Network (RAN) communicatively coupled to a core network. Customers (e.g., users of UEs) may connect to the core network via the RAN. In one example, the RAN may include a base station 120, which can be a trans-receiver. UE/s may establish one or more Packet Data Unit (PDU) sessions which get communicated via the base station. In a 5G communication system, a 5G Core Network (5GC) can be an associated core network and the base station can be a gNodeB (gNB).

Further, the core network may include multiple NFs configured to offer various data and/or telecommunication services. For example, 5GC may include various NFs, such as an Access and Mobility Management Function (AMF), an Authentication Server Function (AUSF), a Policy Control Function (PCF), an Session Management Function (SMF), a User Plane Function (UPF), a Network Exposure Function (NEF), a Network Function Repository Function (NRF), a Unified Data Management (UDM) function, and so forth. One or more of the aforementioned functions may operate as per the Third Generation Partnership Project (3GPP) standards for 5G (e.g., 3GPP Technical Specifications 29.502 and/or 29.518). One or more of these NFs may be instantiated to support PDU sessions of UE/s. In a further example, NFV may be used to virtualize one or more NFs, which can be in the form of executable instructions stored in one or more computer-readable storage mediums.

As per techniques discussed herein, the network slice deployer 130 may concurrently deploy the NF instances of a network slice. The NF instances may be distributively deployed in the network architecture 100, based on various parameters, such as latency, data speed, bandwidth, cost, etc.

In the illustrative example, a first network slice 110A comprises two NF instances NF3 1403 and NF4 1404 deployed at regional data center 105B. A second network slice 1106 comprises one NF instance NF1 1411 deployed at the Edge data center 105A, and two NF instances NF3 1413, and NF5 1415 deployed at the central data center 105C. An $N^{th}$ network slice comprises two NF instances NF1 14N1, NF2 14N2 deployed at the Edge data center 105A, one NF instance NF4 14N4 deployed at the regional data center 105B, and one NF instance NF5 14N5 deployed at the central data center 105C. As used herein, NF instance can be an independent virtual or physical logical network function that can perform functions such as calculation, storage, and network communication.

In some examples, the network architecture 100 may include one or more network nodes deployed at various data centers. In one example, a network node 150 is illustrated that is deployed at the Edge data center 105A. A network node can be a physical resource, a controller, a provisioning system, a container orchestration system, etc. In one example, the network node 150 may at least partially enable end-to-end service for a network slice. In another example, the network node may enable connectivity between UEs and a Data Network (DN). In the ongoing example, the network node 150 may support the instantiation of at least one NF instance (e.g., NF1 14N1 and NF2 14N2 of $N^{th}$ network slice 110N). The network node 150 may include a processor 155 and a storage medium 160. The storage medium 160, which is a non-transitory type, may store instructions 170-178 executable by a processor that causes it to perform one or more actions. Hereinafter, NF1 14N1 may be referred to as a "first NF instance" and NF2 14N2 may be referred to as a "second NF instance."

In some examples, the processor 155 may execute registration instructions 170 that cause the processor 155 to register each NF instance corresponding to the network slice 110N at the NRF. In one example, the NF instance may include a set of NF instances 14N1-14N5. Each NF instance may be registered at the NRF with its respective status indicator as 'DEPLOYING.' This may indicate the initiation of concurrent deployment of the set of NF instances of the network slice 110N. In one example, NRF can be one of the NF instances, say NF4 14N4.

Further, the processor 155 may execute determination instructions 172 that cause the processor 155 to determine whether: a first NF instance 14N1 of the set of NF instances is waiting to be deployed and whether the deployment of the first NF instance 14N1 depends on a second NF instance 14N2 of the set of NF instances that are pending deployment. In one example, the first NF instance 14N1 may be dependent on multiple NF instances of the network slice. Due to such dependency, the first NF instance 14N1 may be deployed after the deployment of the NF instances on which the first NF instance 14N1 depends. As used herein, an NF instance may be considered deployed when a status indicator of that particular NF instance at the NRF is updated to 'REGISTERED' and based on deployment and traffic being processed by the particular NF instance.

The processor 155 may execute update instructions 174 that cause the processor 155 to update the status indicator of the first NF instance 14N1 at the NRF to 'WAIT_REGISTERING.' This change in status to 'WAIT_REGISTERING' indicates the first NF instance 14N1 is waiting for dependent NF instance/s to complete their deployment (e.g., the second NF instance 14N2 to complete its deployment).

The processor 155 may execute subscription instructions 176 that cause the processor 155 to subscribe to be notified of a change in the status indicator of the second NF instance 14N2. That is, the second NF instance 14N2 may update its status indicator at the NRF to 'REGISTERED' when its deployment is complete whereafter the first NF instance 14N1 may receive a notification of such an update.

The processor 155 may execute further update instructions 178 that cause the processor 155 to update the status indicator of the first NF instance 14N1 from 'WAIT_REGISTERING' to 'REGISTERED,' responsive to being notified of a specific change in the status indicator (e.g., to 'REGISTERED') of the second NF instance 14N2. Updating the status indicator to 'REGISTERED' is indicative of the first NF instance 14N1 that it is discoverable by other NF instances at the NRF.

In some examples, each data center 105A, 105B, and 105C may include one or more network nodes with capabilities similar to that of the network node 150, as discussed herein. Each network node may be configured to instantiate one or more NF instances of a network slice.

Figure 2:
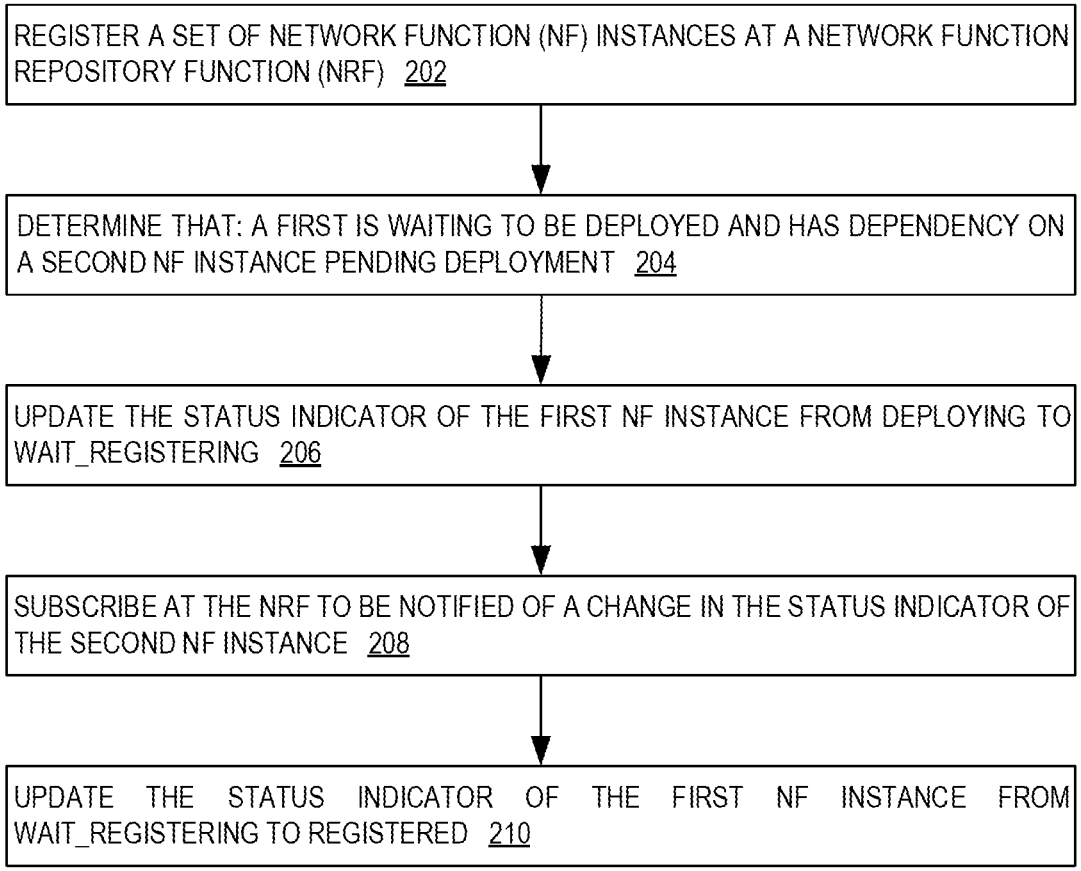
FIG. 2 illustrates a flow diagram depicting a method for deploying a network slice, per various examples of the present disclosure.

FIG. 2 illustrates a flow diagram depicting method 200 for deploying a network slice, per various examples of the present disclosure. Although execution of method 200 is described below with reference to a process, other suitable components for execution of method 200 may be utilized. Additionally, the components for executing method 200 may spread among multiple systems/devices. In some examples, method 200 may be implemented in the form of executable instructions stored on a machine-readable storage medium and/or in the form of electronic circuitry, e.g., hardware. In some further examples, blocks of method 200 may be executed substantially concurrently or in a different order than shown in FIG. 2. In yet some further examples, method 200 may include additional blocks or skip certain blocks than are shown in FIG. 2. In some additional examples, some of the blocks of method 200 may, at certain times, be ongoing and/or may repeat.

At block 202, a set of NF instances of a network slice may be registered at an NRF. Each NF instance of the set of NF instances may include a status indicator set to DEPLOYING upon registration at the NRF. An NF instance may be registered at the NRF so that other NF instances can request the NRF for a specific NF type or an NF service. An NF type may represent different types of NFs or Network Entities that can be found in a 5GC. An NF service can be structured information that is part of an NF profile created during the registration of an NF instance. Further, an NF instance of the same NF type might support different NF services. In some examples, an NF discovery service of the NRF may enable filtering of NF instances by the NF service.

In some examples, the NRF may maintain NF profiles of available NF instances and their associated services. The NRF may support a service discovery function for the discovery of NF profiles registered in the NRF. NF profiles of NF instances maintained at the NRF may include NF instance ID, NF type, Network Slice Identifiers (NSI) ID, NF capacity information, names of supported services, etc. For service discovery, NRF may receive a discovery request from an NF instance and respond to the requested NF instance regarding information associated with discovered NF instance.

Further, at block 204, a first NF instance of the set of NF instances may determine that its deployment (i.e., of the first NF instance) depends on a second NF instance of the set of NF instances. Additionally, the second NF instance may be pending deployment with its status indicator set to 'DEPLOYING.' That is, per some examples, the first NF instance may depend on the second NF instance, which is pending deployment due to which the first NF instance may also be pending deployment. As used herein, "pending deployment" may indicate that the NF instance may have its status indicator set to 'DEPLOYING' or 'WAIT_REGISTERING.' Dependent/dependency, as used herein, may indicate that for the deployment of a given NF instance, it may rely on other NF instance/s to first complete their deployment (e.g., with status indicator 'REGISTERED').

At block 206, responsive to the determination (that the first NF instance has a dependency on the second NF instance and the second NF instance is pending deployment), the first NF instance may update its status indicator from 'DEPLOYING' to 'WAIT_REGISTERING.' According to some examples, the status indicator 'WAIT_REGISTERING' may indicate to other NF instances that the first NF instance is waiting for deployment of certain other NF instance/s (the second NF instance, in the ongoing example).

At block 208, the first NF instance may subscribe at the NRF to be notified of a change in the status indicator of the second NF instance. In some examples, the first NF instance may be dependent on more than one NF instance out of the set of NF instances. In such examples, the first NF instance may subscribe at the NRF to be notified of a change in the status indicator of each of the NF instance over which the first NF instance has a dependency. According to some examples, the first NF instance may subscribe to be notified of changes in the status indicator of the second NF instance. In some examples, the first NF instance is specifically interested to be notified of a change in the status indicator to 'REGISTERED.' The NRF may notify the requesting NF instance (e.g., the first NF instance) whenever there is a change to the status indicator of the NF instance (e.g., the second NF instance).

At block 210, the first NF instance may be notified of a change in the status indicator of the second NF instance when deployment of the second NF instance is complete. Responsive to being notified of the change in the status indicator, the first NF instance may update its status indicator in the NRF from 'WAIT_REGISTERING' to 'REGISTERED.' The status change enables the first NF instance to be discoverable by other NF instances of the set of NF instances. In a further example, other NF instances can now send a service request to the NRF to identify NF instance/s that may be capable of providing a service of interest. In some examples, a third NF instance may be waiting (with the status indicator 'WAIT_REGISTERING') for the first NF instance to be deployed. The third NF instance may update its status indicator from 'WAIT_REGISTERING' to 'REGISTERED,' in response to the discovery of the one or more NF instances (e.g., the first NF instance).

Further, the method may include additional steps for an efficient and concurrent deployment of the NF instances. Such additional steps may be similar to various steps performed by a system, a processor executing instructions, a storage medium encoded with instructions that cause the processor to perform actions, or other means of execution, as per the examples discussed herein.

Figure 3:
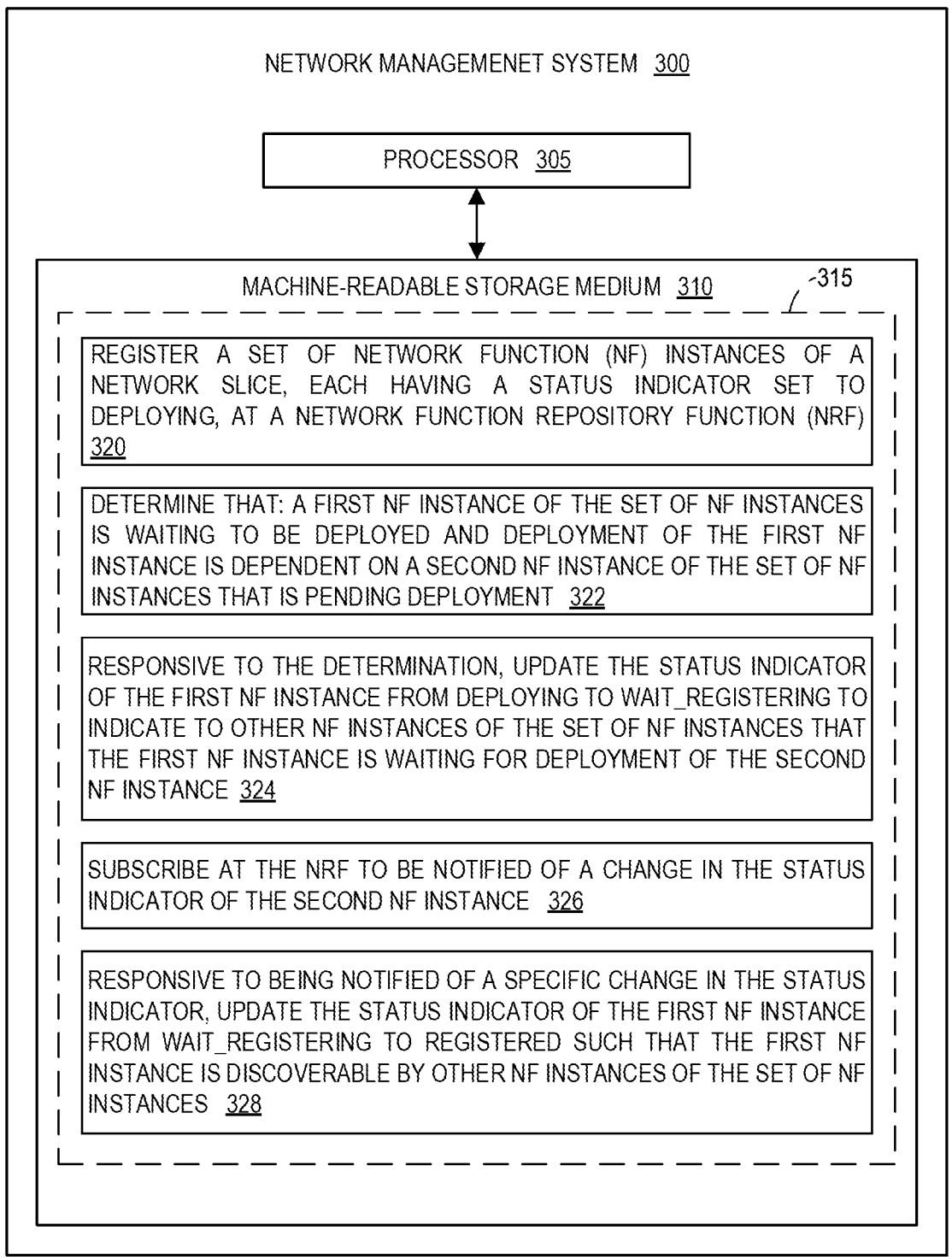
FIG. 3 is a block diagram of a network management system, according to various examples of the present disclosure.

FIG. 3 is a block diagram of a network management system 300, according to various examples of the present disclosure. In one example, network functions can be cloud-native and network management system 300 may include cloud capabilities. In another example, network functions can be containerized applications, built as stateless microservices deployed on a container orchestration platform (e.g., Kubernetes, Docker Swarm, or the like). Such a cloud-native or container orchestration approach may enable more frequent and agile changes to a 5G core network. In some examples, network function/s may be processed at least partially by a network management system, a network slice deployer, or a computing device.

In some examples, network management system 300 may be implemented by hardware, software, or a combination of hardware and software to instantiate various network functions of a network slice. In some examples, the network management system may include processor-executable instructions stored on a non-transitory machine-readable storage medium (e.g., storage medium 310). In some examples, the instructions stored on the storage medium 310 may be executable by a processing resource that causes the processing resource to perform one or more operations as per the present disclosure.

In the examples described herein, a processing resource, e.g., processor 305, may include, for example, one or more processors included in a single computing device or distributed across multiple computing devices. As used herein, a "processor" may be at least one of a central processing unit (CPU), a semiconductor-based microprocessor, a graphics processing unit (GPU), or a field-programmable gate array (FPGA) configured to retrieve and execute instructions. In further examples, other electronic circuitry suitable for the retrieval and execution of instructions stored on a computer-readable storage medium may be used.

In the examples described herein, a processing resource may fetch, decode, and execute instructions 315 stored in the machine-readable type of storage medium 310 to perform concurrent instantiation of network functions, as described herein. Instructions 315, when executed by the processor 305, may at least partially implement some or all functions of network management system 300, as per the present disclosure. Hereinafter, the network management system may be referred to as a 'system' for brevity.

The processor 305 of the system 300, as per instructions 320, may cause the NF instances of a network slice to register at an NRF. The system 300 enables concurrent instantiation of the NF instances by causing each NF instance of the set of NF instances to register at the NRF with a status indicator as 'DEPLOYING.' In some examples, the system 300 may maintain the NRF. In some other examples, another network management system that is independent of the system 300 may maintain the NRF. In some further examples, each NF instance may send a registration message, such as 'Nnrf_NFManagement_NFRegister' along with an NF profile. As used herein, an "NF_profile" may provide parameter/s of an NF instance, including an Internet Protocol (IP) address, Fully Qualified Domain Name (FQDN), or the like to reach the NF instance. The NF profile may also include information about the contents of the services offered, or otherwise exposed, by the NF instance, NF instance identifier (ID) for unique identification (e.g., Universally Unique Identifier (UUID)), supported NF service instances, etc. Further, the registration may take place when a producer NF instance and its NF service instance(s) become operative for the first time.

The processor 305 of the system 300, per instructions 322, may determine that: a first NF instance of the set of NF instances is waiting to be deployed, and deployment of the first NF instance depends on a second NF instance of the set of NF instances that is pending deployment. An NF instance may be considered to be pending deployment when the status indicator is either 'DEPLOYING' or 'WAIT_REGISTERING.'

The processor 305 of the system 300, per instructions 324, may update the status indicator of the first NF instance from 'DEPLOYING' to 'WAIT_REGISTERING,' responsive to a determination that the first NF instance has a dependency on the second NF instance and the second NF instance is pending deployment. In some examples, the first NF instance may be dependent on multiple NF instances and may wait for those multiple NF instances to finish their deployment.

The processor 305 of the system 300, per instructions 326, may subscribe at the NRF to be notified of a change in the status indicator of the second NF instance. In some examples, the first NF instance may be dependent on multiple NF instances; therefore, the first NF instance may subscribe to be notified of the status change of each of the multiple NF instances. Accordingly, the NRF may notify the first NF instance when there is a change in the status of each of the multiple NF instances. Preferably, the NRF may notify a requesting NF instance when the status indicator of NF instance/s of interest changes to 'REGISTERED.'

The processor 305 of the network management system 300, per instructions 328, may update the status indicator of the first NF instance from 'WAIT_REGISTERING' to 'REGISTERED,' responsive to being notified of a specific change in the status indicator of the second NF instance. With the update of the status indicator, the first NF instance may indicate that it may be discoverable by other NF instances of the set of NF instances. In one example, other NF instances may send a service request-related query to the NRF to identify the first NF instance that may be capable of providing the service requested.

Figure 4A:
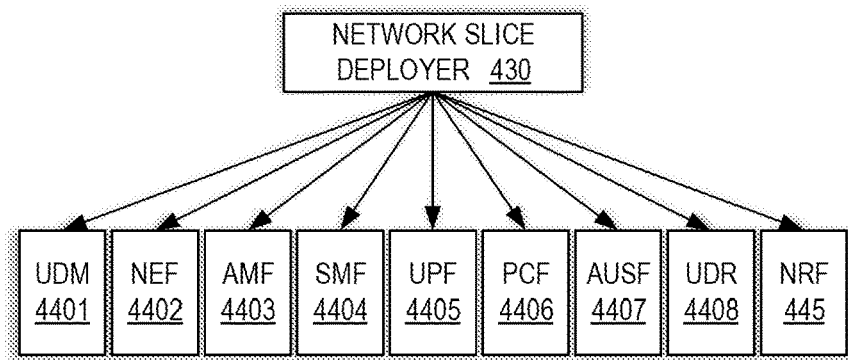
FIG. 4A illustrates a schematic view of deployment of various NF instances of a network slice, in accordance with various examples of the present disclosure.

FIG. 4A illustrates a schematic view of deployment of various NF instances of a network slice, in accordance with various examples of the present disclosure. In some examples, a network slice may include a set of network functions 440A-440G. A network function can be a virtualized function or containerized function using a selected platform, such as VNF or container orchestration platform. In some examples, a Virtualized Infrastructure Manager (VIM) may be used to run the set of network functions. Management and Orchestration (MANO) may monitor network functions that are deployed on the network. Continuous integration and continuous deployment pipeline may be used to manage network function on VIM using MANO components. In some examples, the network slice deployer 430 may enable concurrent deployment of the set of NF instances, as per the techniques disclosed herein.

In the illustrative example, the NF instances 440A-440G may correspond to NF instances of the 5G network slice. Thus, the NF instances may include a UDM 4401, NEF 4402, AMF 4403, SMF 4404, UPF 4405, PCF 4406, Authentication Server Function (AUSF) 4407, a Unified Data Repository 4408, and NRF 445. One or more of these NF instances may have a dependency on other NF instances. In some examples, an NF instance such as UDM 4401 may have dependency over an NF instance such as UDR 4408. In one example, the UDR 4408 may store different types of data, such as subscription, policy, structured, and application data. These data forms can be made available by the UDR 4408 to the UDM 4401. For example, the UDM 4401 can store and retrieve subscription data from the UDR 4408 whereby the UDM 4401 may have a dependency on the UDR 4408.

Techniques for the concurrent deployment of NF instances are discussed in illustrative examples of FIGS. 4B-4F. In FIGS. 4B-4F, the first NF instance can be an NF service consumer and the second NF instance can be an NF service producer. As used herein, NF service consumer may discover a target NF service producer via NRF. As used herein, NF service producer may provide services to a service request from an NF service consumer.

Figure 4B:
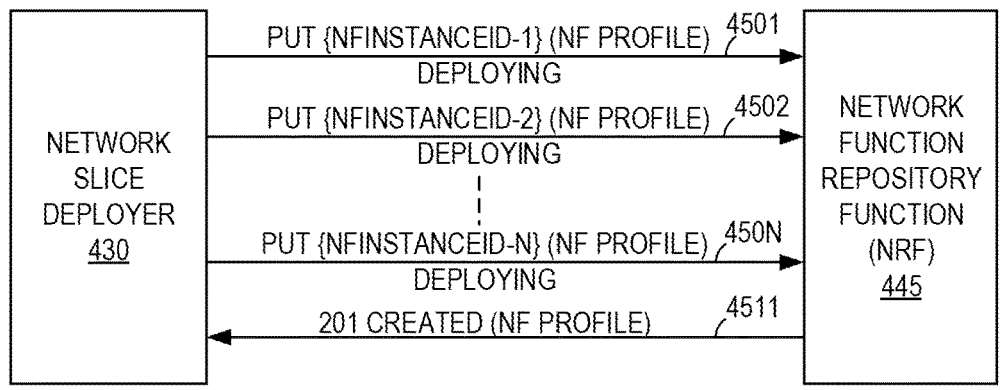
FIG. 4B illustrates a schematic view of deployment of various NF instances for registration in an NRF, in accordance with various examples of the present disclosure.

FIG. 4B illustrates a schematic view of deployment of various NF instances for registration in an NRF, in accordance with various examples of the present disclosure. In some examples, a network slice deployer may concurrently instantiate a set of NF instances (e.g., NF instances 4401-4408, 445 of FIG. 4A) corresponding to a network slice, which is being deployed. Each NF instance of the set of the instances may register 4501, 4502, . . . , 450N their profile in an NRF 445. In some examples, the set of NF instances may use an 'NFRegister' service operation defined for a Nnrf_NFManagement service. The NFRegister may enable an NF instance to register its profile at the NRF 445. The registration of the profile may include the registration of general parameters of an NF instance along with a list of potential services exposed by the NF instance.

Further, each NF instance of the network slice being deployed may register 4501, 4502, . . . , 450N at the NRF 445 with their respective status indicators set as 'DEPLOYING.' As described above, an NF instance ID may be used to uniquely identify each NF instance of the set of NF instances. Hereinafter, for brevity, the NF instance ID may be referred to as "instance ID." In some examples, an NF instance may be registered at the NRF by sending a PUT request for a given NF instance. In one example, the PUT request may include a payload body, which contains a representation of a given NF instance being registered. As used herein, a 'PUT' message can be a Hypertext Transfer Protocol (HTTP) communication used for service request/response in a Service Based Architecture (SBA), as per the present disclosure.

According to some examples, the status indicator of each of the set of NF instances set to 'DEPLOYING' indicates that: from the perspective of the NRF 445, the NF instance that is registered at the NRF 445 is not operational, but other NF instances can discover the particular NF instance. From the perspective of other NF instance/s regarding a given NF instance, the NF instance is waiting to initiate deployment procedure or deployment procedure is in progress and the status indicator may change to 'REGISTERED' on deployment. The value of the status indicator specifies the current status of an NF instance; hence, the status indicator value is updated with a value that indicates the current status of the NF instance.

Based on the successful registration of an NF instance, the network slice deployer may receive a PUT response 4511, per illustrative example. In some examples, the PUT response 4511 may include a "201 created" response with a payload body containing representation (e.g., a complete NF profile or a partial NF profile) of the created resource. "201 created" is an HTTP response that indicates that a request is fulfilled. The network slice deployer 430 may receive a PUT response 4511 for each of the NF instances that are registered at the NRF 445; however, for brevity, only one PUT response is depicted in the illustrative FIG. 4B. In some examples, the NRF 445 may send a "heart-beat timer" along with the PUT response, where the heart-beat timer may indicate a time duration between two consecutive heart-beat messages, which the NRF 445 expects from a given NF instance.

Figure 4C:
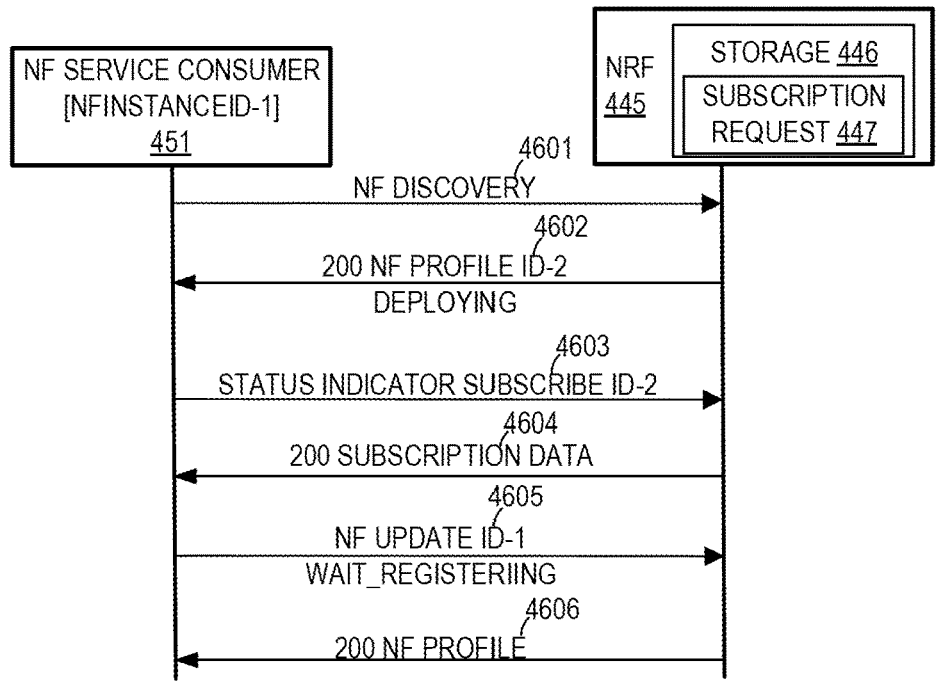
FIG. 4C illustrates a schematic view of communication for discovery of an NF instance at NRF, per various examples of the present disclosure.

FIG. 4C illustrates a schematic view of communication for discovery of an NF instance at NRF 445, per various examples of the present disclosure. According to some examples, a first NF instance 451 (NFIDInstance-1) may send a discovery request 4601 to an NRF 445, to discover services offered by NF instances registered at the NRF 445.

Per the illustrative example, the first NF instance may send an 'NFDiscovery' service request 4601, which enables an NF instance to discover other NF instance/s with potential services offered. The first NF instance 451 can be an NF service consumer and identifiable by its instance ID. The first NF instance 451 may receive a response (e.g., "200") 4602 from the NRF 445 on successful identification of the NF service. Further, the body of the response may include the NF profile (e.g., NF profile ID-2) corresponding to the NF instance (e.g., the second NF instance) identified in the request. Further, the NRF 445 may indicate in the response the current status indicator value of the NF instance that is requested for.

Further, the first NF instance 451 may subscribe 4603 to be notified at the NRF 445 regarding a change in the status of the second NF instance. Per illustrative example, the first NF instance 451 may send a subscription request 4603, such as 'NFStatusSubscribe' at the NRF 445. In one example, the first NF instance performs the subscription operation by sending a POST request to the NRF 445. A POST request may create a new subscription for notification/s related to changes in the status indicator of specified NF instance/s. In some examples, the NRF 445 may include a storage 446 configured to store subscription request/s 447 received from various NF instances.

According to further examples, a body of the subscription request may include the type of notifications that the first NF instance, which is the NF service consumer, may be interested in receiving. The notifications of interest may relate to status change information of one or more NF instances on which the NF service consumer depends. Further, the request may also include a Uniform Resource Identifier (URI), where the first NF instance 451 may be prepared to receive notifications. In some examples, along with the request, an NF instance may communicate a validity time, which represents the desired time duration for which the subscription is to be active. Upon expiry of the time duration, the requesting NF instance may not receive further status indicator notifications. Thus, the NF instance may have to send a fresh subscription request in order to be notified of changes in the status indicator. Further, in one example, the subscription request may include a list of attributes that may be monitored in the NF profile, such that a notification can be sent when any of the listed attributes change. Further, the first NF instance 451 may subscribe to be notified of multiple NF Instances. Upon successful subscription, the first NF instance 451 may receive a response (e.g., 200) 4604 from the NRF 445. The response 4604 may include data related to the subscription (e.g., subscription data).

The first NF instance 451 may update 4605 its status indicator at the NRF 445 to 'WAIT_REGISTERING.' As used herein, 'WAIT_REGISTERING' may refer to a status indicator that is interpreted by the NRF 445 that the given NF instance that is registered at the NRF 445 is not operative, but can be discovered by other NF instances. Whereas, other NF instances may interpret this status indicator as, the given NF instance is ready to be registered, but waiting for other NF instances that the given NF instance depends on to finish deploying to update its status indicator to 'REGISTERED.' An NF instance is considered to be operational/started when it starts processing network traffic. Updating the status indicator may include modifying the status indicator of the first NF instance 451 from 'DEPLOYING' to 'WAIT_REGISTERING.'

In some examples, the first NF instance 451 may use the 'NFUpdate' service operation to update the status indicator. This service operation may be used to update the NF profile of the first NF instance 451 by providing an updated NF profile with appropriate changes. In some examples, depending on the type of update, the first NF instance 451 may send a PUT/PATCH HTTP request. The PUT request may update the overall NF profile with a payload body of the PUT request containing the latest NF profile, which has to completely replace the NF profile that may be present earlier. Whereas, a PATCH request may partially update the NF profile. On successful update of the status indicator, the NRF 445 may send a response (e.g., "200") 4606 to the first NF instance 451. In case of failure to update the status indicator, the first NF instance 451 may receive failure related error code. Further, the first NF instance 451 that is dependent on the second NF instance 452 may wait to be notified by the NRF 445, instead of sending continuous requests to the NRF 445, which may cause irrelevant alerts, such as errors, traces, and/or logs.

Figure 4D:
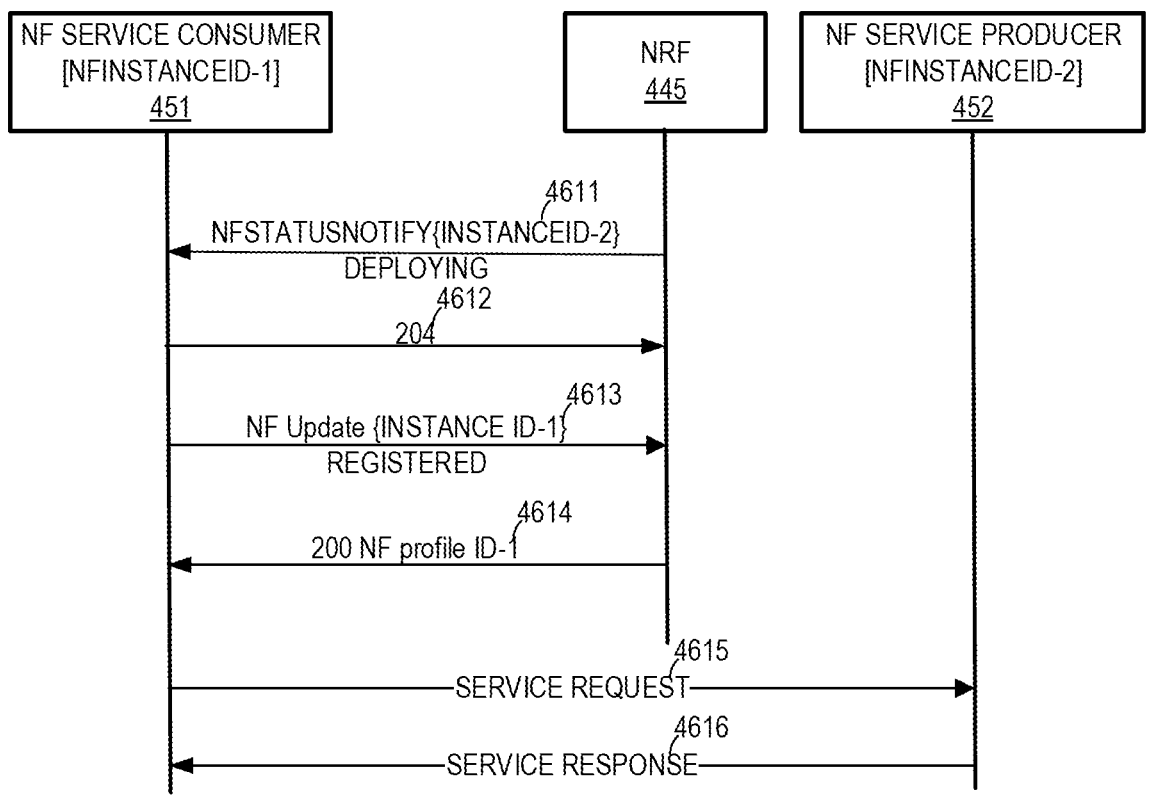
FIG. 4D illustrates another schematic view of communication discovery of an NF instance at NRF, per various examples of the present disclosure.

FIG. 4D illustrates another schematic view of communication discovery of an NF instance at the NRF 445, per various examples of the present disclosure. On instantiation of a given NF instance, the NRF 445 may send a notification (e.g., NFStatusNotify) 4611 to an NF instance that has previously subscribed to be notified of changes in the status indicator. Per illustrative example of FIG. 4D, the first NF instance 451 may receive a notification 4611 regarding a change in the status of the second NF instance 452 from the NRF 445. In a further example, the NRF may notify an NF instance at a URI specified during the subscription process. A body of the notification may include the reference to the NF instance that has a changed status indicator. The NRF 445 may indicate an event type as 'NF_PROFILE_CHANGED' in the notification being received by the first NF instance 451. In some instances, the first NF instance 451 may receive an entire profile that has changes or details of specific changes in the profile. On receiving the notification, the first NF instance 451 may send a response 4612 to the NRF 445. In one example, the response can be a "204" (no content), which is an HTTP status code that indicates that a request is fulfilled and there is no additional content to send in the body of the response.

Further, in response to being notified of the change in the status indicator of the second NF instance 452, the first NF instance 451 may update 4613 its status indicator at the NRF 445. That is, per one example, the first NF instance 451 may send an update request (e.g., 'NFUpdate') 4613 to the NRF 445 to change the status indicator from 'WAIT_REGISTERING' to 'REGISTERED' such that the first NF instance 451 may be discoverable by other NF instances. As discussed in earlier examples, the 'NFUpdate' service request may update the NF profile of the first NF instance 451 by providing an updated NF profile with appropriate changes. On successful update of the status indicator, the NRF 445 may send a response (e.g., "200") 4614 to the first NF instance 451.

Further, the first NF instance 451 may use direct communication with the second NF instance 452 for availing services. For direct communication, the first NF instance 451, which may be an NF service consumer, discovers the target NF service producer, which can be the second NF instance 452, per ongoing example. Accordingly, the first NF instance 451 may send a service request 4615 to the second NF instance 452. In response, the first NF instance 451 may receive a service response 4616 from the second NF instance 452.

Figure 4E:
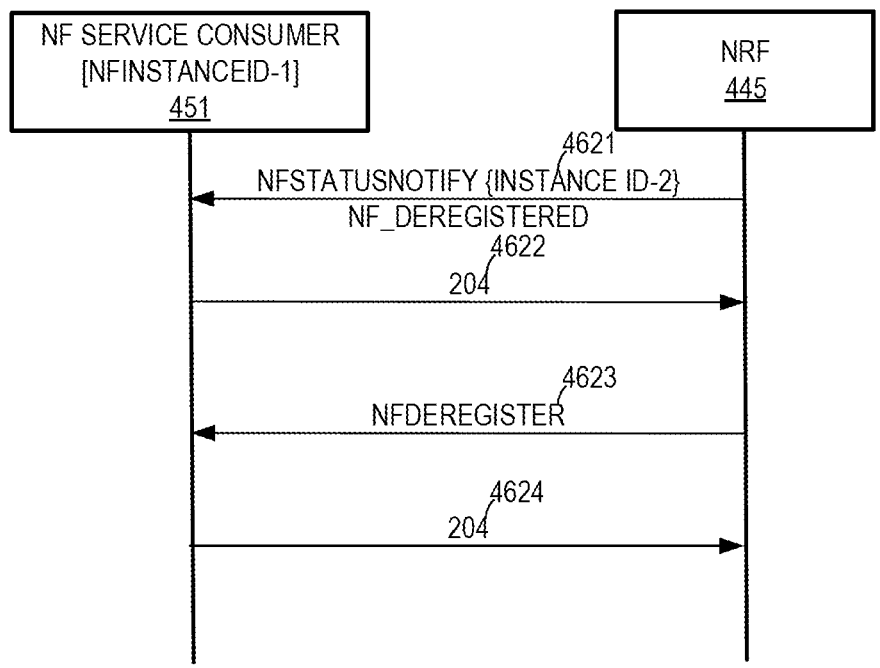
FIG. 4E illustrates a schematic view of communication between an NF instance and an NRF, according to various examples of the present disclosure.

FIG. 4E illustrates a schematic view of communication between an NF instance and an NRF 445, according to various examples of the present disclosure. According to one example, the first NF instance 451 may be dependent on the second NF instance (e.g., the second NF instance 452 of FIG. 4D). In one example, an NF service consumer, such as the first NF instance 451, may send a discovery request to the NRF 445 to discover an NF service producer, based on potential services offered by the NF service producer. In some instances, the first NF instance 451 may wait for the second NF instance 452 to complete instantiation so that the first NF instance 451 can start operation.

However, in certain conditions, the instantiation of an NF instance may fail during deployment. For example, an NF instance may have a status indicator as 'DEPLOYING' at the time it fails instantiation. A deployer (e.g., network slice deployer 130 of FIG. 1) may receive information regarding such failure. Nevertheless, an NF service consumer may not be aware of such failure and may continue in a wait state for the NF instance to finish instantiation, as per some existing processes. According to some examples of the present disclosure, an NF service consumer may subscribe at an NRF 445 to be notified of a change in the status indicator of an NF instance on which it may be waiting. Thus, when instantiation of an NF instance (e.g., the second NF instance 452) for which other NF instances (e.g., the first NF instance 451) subscribed to have failed, the first NF instance 451 may receive a notification request 4621 from the NRF 445 indicating that the second NF instance 452 is 'DEREGISTERED.' A change in the status indicator to 'DEREGISTERED' may indicate that the particular NF instance is deregistered from the NRF 445 due to a failure to instantiate or any other condition/s leading to deregistration. The notification request 4621 may include a status indicator value 'NF_DEREGISTERED.' The first NF instance 451 may receive notification/s of deregistration of the second NF instance 452 from the NRF 445, and the notification request body may include the instance ID of the deregistered NF Instance. On receiving the notification request, the first NF instance 451 may send a response 4622 to the NRF 445. In one example, the response can be a "204" (no content).

Further, the first NF instance 451 may send a deregister request 4623 to the NRF 445. In one example, the deregister request can be a Deregister service request. The deregister request enables the first NF instance 451 to deregister its NF profile at the NRF 445. Deregistration may include the deregistration of services offered by the first NF instance 451 from the NRF 445. On sending the deregistration request, the first NF instance 451 may receive a response 4624 from the NRF 445. In one example, the response can be a "204" (no content), which indicates that no data is included in the body of the response.

Figure 4F:
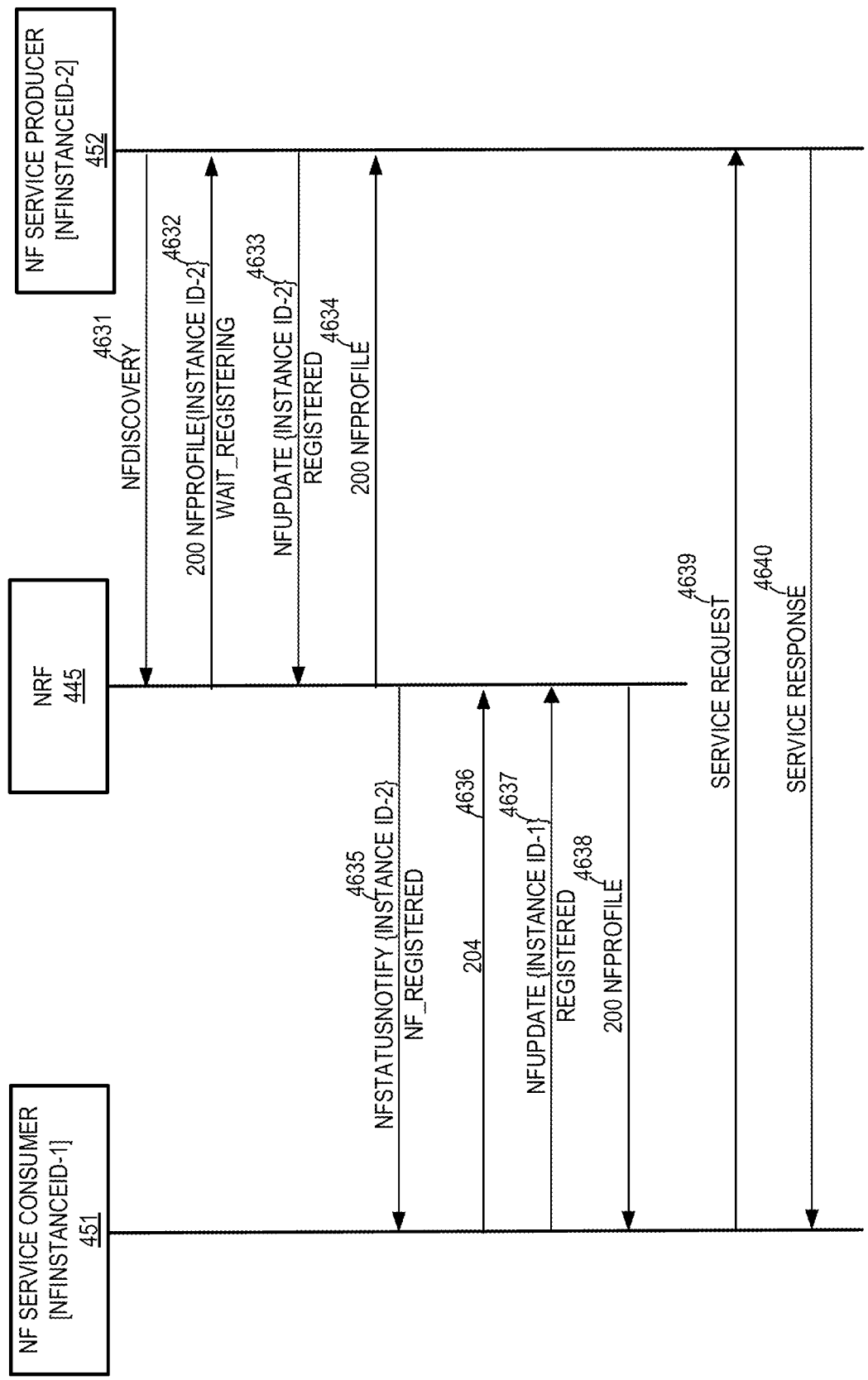
FIG. 4F illustrates a schematic view of communication between NF instances with interdependency, in accordance with various examples of the present disclosure.

FIG. 4F illustrates a schematic view of communication between NF instances with interdependency, in accordance with various examples of the present disclosure. That is, per one example, the first NF instance 451 may have dependency over the second NF instance 452 and may wait for the second NF instance 452 to instantiate. The first NF instance 451 may wait for the second NF instance 452 to be 'REGISTERED.' Similarly, the second NF instance 452 may be dependent upon the first NF instance 451 and may wait for the status indicator of the first NF instance 451 to be 'REGISTERED.' Traditionally, due to such interdependency, there might arise a deadlock condition.

According to some examples of the present disclosure, the first NF instance 451 and the second NF instance 452 can be concurrently instantiated. The first and the second NF instances 451 and 452 may register at the NRF 445 with their status indicators set to 'DEPLOYING.' Further, the first NF instance 451 may send a discovery request for the second NF instance 452 to the NRF 445. The first NF instance 451 may receive a response, which includes status indicator information of the second NF instance 452, from the NRF 445. Based on the condition that the status indicator of the second NF instance 452 may also be 'DEPLOYING,' the first NF instance 451 subscribes to be notified of a change in the status indicator of the second NF instance 452. Further, the first NF instance 451 may update its status indicator to 'WAIT_REGISTERING,' The aforementioned process can be similar to the process 4601-4606 elaborated in the example illustration FIG. 4C.

Similarly, the second NF instance 452 may send a discovery request 4631 to the NRF 445. The second NF instance 452 may receive a response (e.g., "200") 4632 from the NRF 445. A body of the response from the NRF 445 may include profile information corresponding to the first NF instance 451, where the status indicator of the first NF instance 451 may also be 'WAIT_REGISTERING.' Based on conditions that the status indicator of the first NF instance 451 and the second NF instance 452 is 'WAIT_REGISTERING,' the second NF instance 452 may determine that there may be a deadlock condition. In response to the determination of the possible deadlock condition, the second NF instance 452 may send an update request 4633 to the NRF 445 with the status indicator updated to 'REGISTERED.' The second NF instance 452 may receive a response 4634 from the NRF 445, where the response can be "200," which is an HTTP success status response code indicating that the request is successful.

In response to a change in the status indicator of the second NF instance 452 from 'WAIT_REGISTERING' to 'REGISTERED,' the first NF instance 451 may receive a notification 4635 from the NRF 445. The first NF instance 451 may send a response 4636 to the NRF 445. In one example, the notification from the NRF indicates that the status indicator of the first NF instance 451 has changed and thus, enabling the first NF instance 451 to update its status indicator. The first NF instance 451 may then send an update request 4637 to the NRF 445 to update the status indicator to 'REGISTERED.' The NRF 445 may send a response 4638 to the first NF instance 451. Thus, both the NF instances 451 and 452 with interdependency can be concurrently deployed for registration at the NRF and the NF instance/s can identify a possible deadlock condition and avoid it by way of the examples discussed herein. In a further example, the first NF instance 451 may send a service request 4639 to the second NF instance 452, and the first NF instance 451 may receive a response 4640 from the second NF instance 452.

Figure 5:
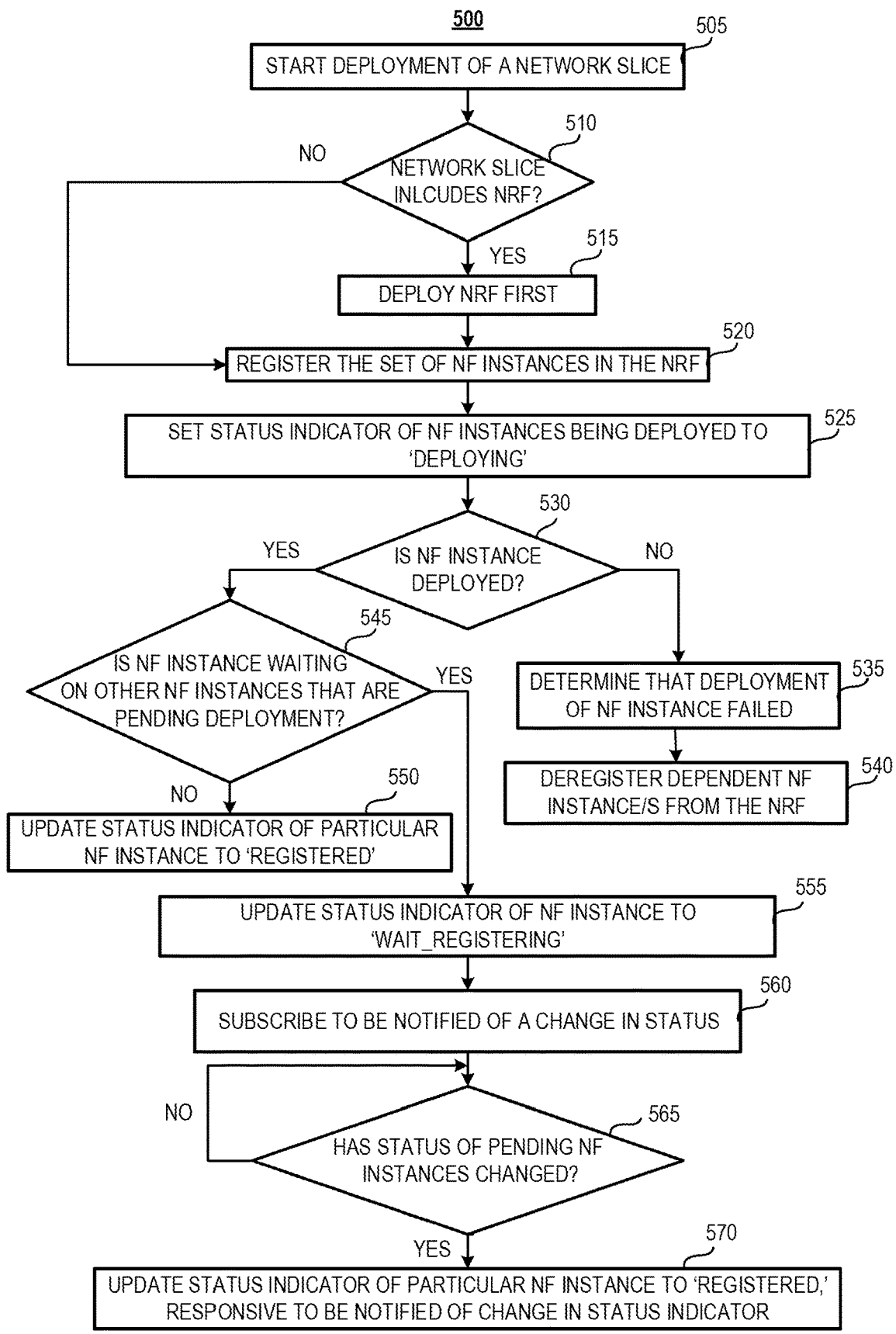
FIG. 5 illustrates a flow diagram for deployment of a network slice, in accordance with various examples of the present disclosure.

FIG. 5 illustrates a flow diagram for deployment of a network slice, in accordance with various examples of the present disclosure. Blocks of the flow diagram may be executable by a single system, such as the network management system 300 of FIG. 3, or may spread among multiple systems/devices. In one example, the flow diagram 500 may be implemented in the form of executable instructions stored on a machine-readable storage medium and/or in the form of electronic circuitry, e.g., hardware. One or more blocks of the flow diagram 500 may be executed substantially concurrently, in a different order than shown in FIG. 5, per some examples. In some other examples, one or more blocks may be skipped, and at certain times, can be ongoing and/or may repeat. In some examples, the blocks of the flow diagram 500 may be stored as instructions in a storage medium of a system (e.g., the network management system 300 of FIG. 3). Such instructions are executable by a processing resource (e.g., the processor 305 of FIG. 3) that cause the processing resource to perform one or more steps discussed herein.

At block 505, a network slice deployer may initiate the deployment of a network slice. In one example, the network slice deployer can have CI and/or CD capability. In some examples, the network slice may include a set of NF instances. In some further examples, the network slice may also include an NRF as part of the set of NF instances being deployed.

At block 510, the network slice deployer may determine if the network slice includes an NRF and whether the NRF is deployed. Herein, the terms 'deployed' and 'installed' are interchangeably used. Deployed/installed may indicate that an NF workload, which can be a collection of files that describe a related set of container orchestration resources (e.g., Helm chart or Operator Custom Resource), has been instantiated on a target runtime environment (e.g., Kubernetes, Docker Swarm, etc.). Further, an NF instance is considered to be started when processes that compose an NF application have started (e.g., associated containers may be running in Kubernetes pods).

At block 515, based on the condition that the NRF is part of the network slice (i.e., YES condition at block 510), the network slice deployer may deploy the NRF first. That is, deployment of the NRF may be processed on priority before deploying other NF instances of the network slice. In some examples, the flow diagram 500 may include additional blocks to determine whether an NF management service endpoint of the NRF is configured for access by the network slice deployer (e.g., the network slice deployer 130 of FIG. 1). Upon configuration of the NF management service endpoint to be accessible by the network slice deployer, the set of NF instances are registered on their behalf in the NRF for concurrent deployment.

At block 520, based on a determination that the network slice does not include an NRF (i.e., NO condition at block 510) and the NRF is instantiated, the network slice deployer may register the set of NF instances at the NRF. In some examples, an NF instance is considered to be registered when an NF application has performed initialization phases before handling network traffic. Further, upon performing initialization phases, the NF instance may declare to be operationally ready by registering at the NRF.

At block 525, each NF instance of the set of NF instances that are registered at the NRF has its status indicator at the NRF set to 'DEPLOYING.' The NRF considers such NF instances that are registered and not operational, but the NF instance/s can be discovered by other NF instances. Other NF instance/s consider the NF instances with status value 'DEPLOYING,' as waiting to initiate deployment procedure or deployment procedure is in progress and the status indicator may change to 'REGISTERED' on deployment.

At block 530, the deployment of each of the NF instances of the set of NF instances is checked. As used herein, an NF instance may be considered to be deployed when a workload of the particular NF instance has been instantiated on a target runtime environment. In one example, the target runtime environment can be a container orchestration platform.

At block 535, based on the condition that a particular NF instance is not deployed (i.e., NO condition at block 530), the deployment of a particular NF instance is considered to be failed. Hereinafter, in the current example, the particular NF instance may be referred to as a "first NF instance" for ease of reference.

At block 540, the first NF instance, which has failed deployment, may be deregistered from the NRF by the network slice deployer. In some examples, a second NF instance of the set of NF instances may have a dependency on the first NF instance. Responsive to a failure of instantiation of the first NF instance, the second NF instance may be notified of status change. The second NF instance may deregister an NF profile of the second NF instance from the NRF. Further, the second NF instance may be shut down.

Whereas, at block 545, based on a condition that the first NF instance is deployed (i.e., YES condition at block 530), it may be determined whether the first NF instance is waiting for other NF instance/s that are pending deployment. This may determine if the first NF instance is dependent on one or more NF instances.

At block 550, based on the condition that the first NF instance is not waiting on any other NF instances (i.e., NO condition at block 545), the first NF instance may update its status indicator at the NRF to 'REGISTERED.' Due to no dependencies, the first NF instance completes registration and may be available to consume network traffic.

At block 555, based on a condition that the first NF instance is waiting on other NF instance/s (i.e., YES condition at block 545), the first NF instance updates its status indicator at the NRF to 'WAIT_REGISTERING.' That is, the first NF instance may update its status indicator from 'DEPLOYING' to 'WAIT_REGISTERING' to indicate to other NF instances that it is waiting for deployment of other NF instance/s over which it is dependent.

At block 560, the first NF instance may subscribe at the NRF to be notified of a change in the status of the other NF instance/s at the NRF. As discussed earlier, the first NF instance may send a subscription request by communicating a POST request to the NRF. A POST request may create a new subscription for notification/s related to changes in the status indicator of NF instance/s specified in the request.

At block 565, the NRF may determine whether the status indicator of the NF instance/s, over which the first NF instance is dependent, has changed. Based on the determination that the status of the NF instance/s has not changed (i.e., NO condition at block 565), the NRF may wait for the status change.

At block 570, based on a condition that the status indicator of the first NF instance has changed (i.e., YES condition at block 565), the first NF instance may be notified by the NRF of a change in the status indicator. Responsive to being notified of a specific change in the status indicator (e.g., to 'REGISTERED'), the first NF instance may update its status indicator from 'WAIT_REGISTERING' to 'REGISTERED.' With the status change of the first NF instance, it is discoverable by other NF instances for service request/s.

Figure 6:
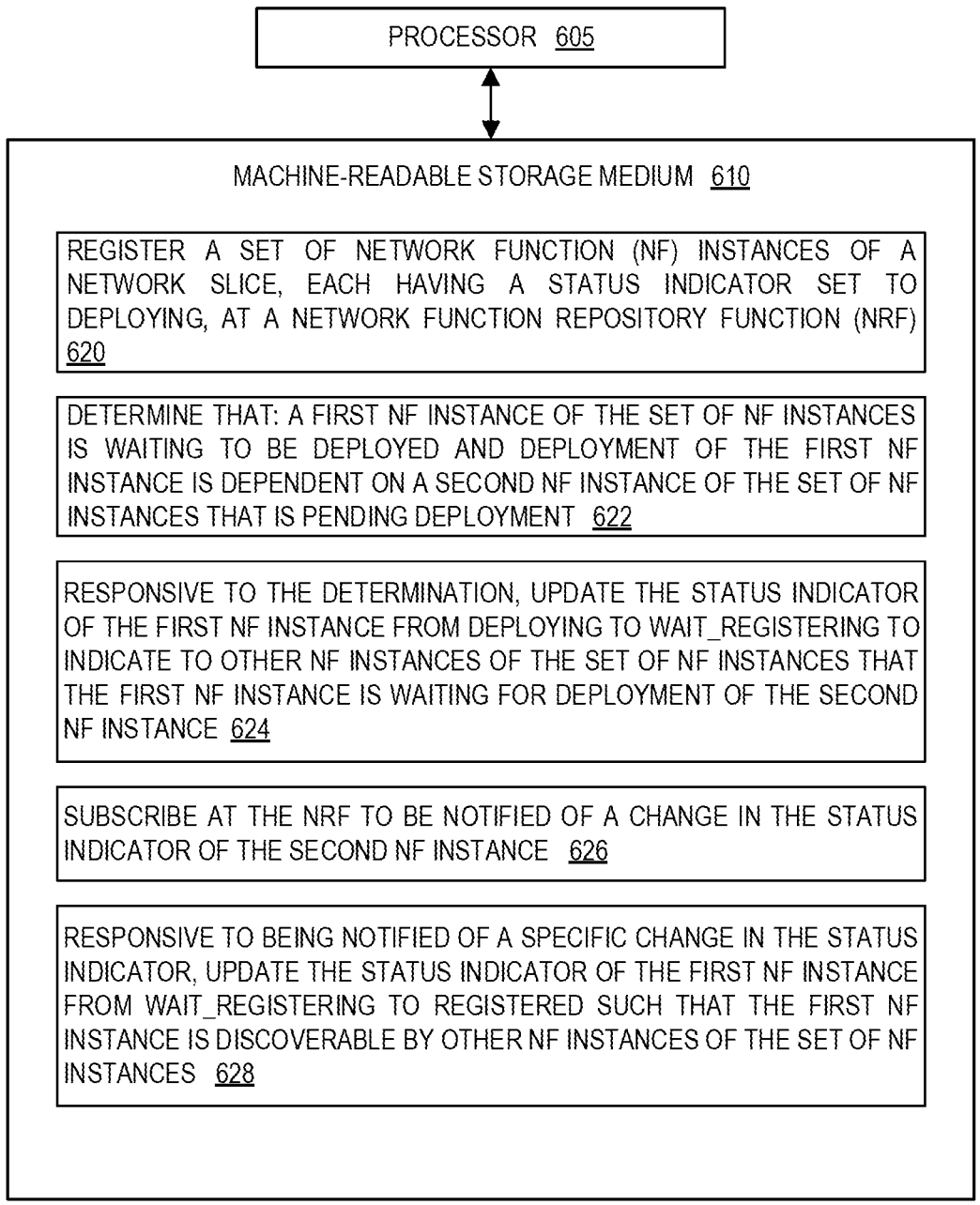
FIG. 6 illustrates a block diagram of a storage medium storing instructions that are executable by a processor, according to various examples of the present disclosure.

FIG. 6 depicts a block diagram of a storage medium 610 storing instructions that are executable by a processor 605, according to various examples of the present disclosure. Furthermore, it should be appreciated that although the various instructions are illustrated as being co-located within a single processing unit, in some examples, multiple processing units may be used, and one or more instructions may be executed remotely from the other instructions. In some examples, the instructions 620-628 may be encoded on the storage medium 610.

In some examples, the instructions 620, may be executable by the processor 605, to enable the registration of a set of NF instances of a network slice at an NRF. Each NF instance of the set of NF instances may register at the NRF with a status indicator as 'DEPLOYING.'

In some examples, the instructions 622, may be executable by the processor 605, to determine that: a first NF instance of the set of NF instances is waiting to be deployed;

and deployment of the first NF instance is dependent on a second NF instance of the set of NF instances that is pending deployment. An NF instance may be considered to be pending deployment when the status indicator is either 'DEPLOYING' or 'WAIT_REGISTERING.'

In some examples, the instructions 624, may be executable by the processor 605, to update the status indicator of the first NF instance from 'DEPLOYING' to 'WAIT_REGISTERING,' responsive to the determination that the first NF instance has a dependency on the second NF instance and the second NF instance is pending deployment.

In some examples, the instructions 626, may be executable by the processor 605, to subscribe at the NRF to be notified of a change in the status indicator of the second NF instance. In some examples, the first NF instance may be dependent on multiple NF instances; therefore, the first NF instance may subscribe to be notified of the status change of each of the multiple NF instances. The instructions 626 may cause the first NF instance to subscribe to be notified of changes in the status indicator. Accordingly, the NRF may notify the first NF instance when there is a change in the status of each of the multiple NF instances.

In some examples, the instructions 628, may be executable by the processor 605, to update the status indicator of the first NF instance from 'WAIT_REGISTERING' to 'REGISTERED,' responsive to being notified of a specific change in the status indicator. The specific change can be when the status indicator changes to 'REGISTERED.' Further, with the status change of the first NF instance, the first NF instance may indicate that it may be discoverable by other NF instances of the set of NF instances. In one example, other NF instances can now send a service request-related query to the NRF to identify an NF instance that may be capable of providing the service requested.

In general, the words "component," "system," and the like, as used herein, can refer to logic embodied in hardware or firmware, or to a collection of instructions, possibly having entry and exit points, written in a programming language. It will be appreciated that software components may be callable from other components or from themselves, and/or may be invoked in response to detected events or interrupts. Software code may be stored, partially or fully, on a memory device of the executing computing device, for execution by the computing device. Software instructions may be embedded in firmware, such as an Erasable Programmable Read-Only Memory (EPROM). It will be further appreciated that hardware components may be comprised of connected logic units, such as gates and flip-flops, and/or may be comprised of programmable units, such as programmable gate arrays or processors.

As used herein, the term "or" may be construed in either an inclusive or exclusive sense. Moreover, the description of resources, operations, or structures in the singular shall not be read to exclude the plural. Conditional language, such as, among others, "can," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open-ended as opposed to limiting. Adjectives such as "traditional," "known," and terms of similar meaning should not be construed as limiting the item described to a given period or to an item available as of a given time, but instead should be read to encompass conventional, normal, or standard technologies. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
    registering a set of Network Function (NF) instances of a network slice, each NF instance of the set of NF instances having a status indicator set to DEPLOYING, at a Network Function Repository Function (NRF);
    determining that:
        a first NF instance of the set of NF instances is waiting to be deployed; and
        deployment of the first NF instance is dependent on a second NF instance of the NF instances that is pending deployment;
    responsive to the determination, updating the status indicator of the first NF instance from DEPLOYING to WAIT_REGISTERING to indicate to other NF instances of the set of NF instances that the first NF instance is waiting for deployment of the second NF instance before deploying;
    subscribing, the first NF instance to the NRF to be notified of a change in the status indicator of the second NF instance; and
    responsive to being notified of a specific change in the status indicator, updating the status indicator of the first NF instance from WAIT_REGISTERING to REGISTERED such that the first NF instance is discoverable by other NF instances of the set of NF instances.

2. The method as claimed in claim 1, further comprising:
    deploying the Network Function Repository Function (NRF) prior to the registration of the set of NF instances based on a determination that the NRF is part of the network slice.

3. The method as claimed in claim 2, further comprising:
    based on a condition that the NRF is deployed during deployment of the set of NF instances of the network slice, configuring an NF management service endpoint of the NRF such that the NF management service endpoint is accessible by a network slice deployer, wherein the network slice deployer is configured to perform automated deployment of the network slice.

4. The method of claim 1, wherein registering the set of NF instances further comprises:
    instantiating the set of NF instances as virtualized functions on a platform;
    responsive to a failure of instantiation of the first NF instance of the set of NF instances, deregistering a Network Function (NF) profile of a third NF instance of the set of NF instances that is waiting on the first NF instance to complete registration; and
    shutting down the third NF instance.

5. The method as claimed in claim 1, further comprising:
    responsive to an initiation of an undeployment process of the network slice, updating the status indicator of the set of instances at the NRF to UNDEPLOYING such that the set of NF instances are concurrently undeployed.

6. The method as claimed in claim 1, further comprising:
    determining that the first NF instance and the second NF instance are deployment interdependent;
    querying by the first NF instance for the status indicator of the second NF instance;

based on a condition that the status indicator of the second NF instance is WAIT_REGISTERING, updating by the first NF instance the status indicator to REGISTERED; and updating the status indicator of the second NF instance to REGISTERED at the NRF, based on a condition that the first NF instance is registered.

7. The method as claimed in claim 1, wherein registering the set of NF instances at the NRF includes:
providing an NF profile of each NF instance of the set of instances to the NRF, wherein each NF profile includes a list of services provided by a particular NF instance.

8. The method as claimed in claim 1, wherein the status indicator of a third NF instance is updated from WAIT_REGISTERING to REGISTERED responsive to discovery of the one or more NF instances that are pending deployment.

9. The method as claimed in claim 1, wherein the status indicator with a value REGISTERED indicates that an NF instance is registered at the NRF and is discoverable by other NF instances.

10. The method as claimed in claim 1, wherein the status indicator with a value DEPLOYING indicates that an NF instance is waiting to initiate deployment procedure or deployment procedure is in progress, and the status indicator changes to 'REGISTERED' on deployment.

11. The method as claimed in claim 1, wherein the status indicator with a value WAIT_REGISTERING indicates that an NF instance is ready to be registered and waiting for other NF instances that it depends on to finish deploying before it finishes its deployment.

12. The method as claimed in claim 1, wherein the set of NF instances are concurrently deployed for registration at the NRF by a network slice deployer with Continuous Deployment (CD) capability.

13. The method as claimed in claim 1, further comprising:
updating, by the first NF instance, the status indicator from DEPLOYING to REGISTERED based on a condition that the first NF instance is deployed and has started processing network traffic of the network slice.

14. A system, comprising:
a processor; and
a storage medium operatively connected to the processor and storing instructions that when executed, causes the processor to:
register a set of Network Function (NF) instances at a Network Function Repository Function (NRF) with status indicator of the set of NF instances set to DEPLOYING, wherein the set of NF instances is part of a network slice;
update the status indicator of a first NF instance of the set of instances to WAIT_REGISTERING based on a condition that the first NF instance is in a wait state to be deployed and the first NF instance has dependency on one or more NF instances of the set of NF instances that are pending deployment;
subscribe to be notified to the first NF instance of a change in the status indicator of the one or more NF instances that are pending deployment; and
responsive to being notified of a specific change in the status indicator, update the status indicator of the first NF instance from WAIT_REGISTERING to REGISTERED such that the first NF instance is discoverable by other NF instances of the set of NF instances.

15. The system of claim 14, wherein the instructions that cause the processor to subscribe to notify, includes further instructions that cause the processor to:
receive at the first NF instance a notification from the NRF regarding a change in the status indicator of the one or more NF instances at the NRF.

16. The system of claim 14, wherein the system includes a network slice deployer to deploy the set of NF instances concurrently.

17. A non-transitory storage medium storing instructions, the instructions executable by a processor, to:
deploy a Network Function Repository Function (NRF) on priority based on a determination that the NRF is part of a network slice being deployed and the NRF is pending to be deployed;
register a set of Network Function (NF) instances at the NRF with status indicator of the set of NF instances set to DEPLOYING, wherein the set of NF instances is part of the network slice;
update the status indicator of a first NF instance of the set of instances to WAIT_REGISTERING based on a condition that the first NF instance is in a wait state to be deployed and the first NF instance is dependent on one or more NF instances of the set of NF instances that are pending deployment;
subscribe to be notified to the first NF instance of a change in the status indicator of the one or more NF instances that are pending deployment; and
responsive to being notified of a specific change in the status indicator, update the status indicator of the first NF instance from WAIT_REGISTERING to REGISTERED such that the first NF instance is discoverable by other NF instances of the set of NF instances.

18. The non-transitory storage medium as claimed in claim 17, wherein the instructions to register the set of NF instances at the NRF, includes instructions to:
concurrently register the set of NF instances at the NRF; and
update the status indicator of one or more NF instances of the set of NF instances to REGISTERED based on deployment and traffic being processed by the one or more NF instances.

19. The non-transitory storage medium as claimed in claim 17, wherein each NF instance of the set of NF instances is uniquely identifiable based on a Universally Unique Identifier (UUID).

20. The non-transitory storage medium as claimed in claim 17, wherein the instructions include further instructions to:
instantiate the set of instances as virtualized functions on a platform;
based on a failure of instantiation of the first NF instance of the set of NF instances, deregister by a second NF instance that is waiting on the first NF instance to complete registration; and
shut down the second NF instance.

* * * * *